United States Patent
Kritzer

(10) Patent No.: US 12,358,769 B2
(45) Date of Patent: Jul. 15, 2025

(54) COMBINATION TWO POST VEHICLE AND BATTERY LIFT

(71) Applicant: BendPak, Inc., Agoura Hills, CA (US)

(72) Inventor: Jeffrey S. Kritzer, Moorpark, CA (US)

(73) Assignee: BendPak, Inc., Agoura Hills, CA (US)

( * ) Notice: Subject to any disclaimer, the term of this patent is extended or adjusted under 35 U.S.C. 154(b) by 0 days.

(21) Appl. No.: 18/652,607

(22) Filed: May 1, 2024

(65) Prior Publication Data

US 2024/0367956 A1 Nov. 7, 2024

Related U.S. Application Data

(60) Provisional application No. 63/499,291, filed on May 1, 2023.

(51) Int. Cl.
*B66F 7/26* (2006.01)
*B60L 53/80* (2019.01)

(52) U.S. Cl.
CPC .............. *B66F 7/26* (2013.01); *B60L 53/80* (2019.02)

(58) Field of Classification Search
CPC .... B60L 53/80; B66F 7/20; B66F 7/28; B66F 7/26; B66S 5/06
See application file for complete search history.

(56) References Cited

U.S. PATENT DOCUMENTS

| | | | | |
|---|---|---|---|---|
| 4,084,790 A * | 4/1978 | Molnar | ............. | B66F 7/02 254/90 |
| 5,207,296 A | 5/1993 | Beattie et al. | | |
| 5,211,264 A * | 5/1993 | Beattie | ............. | B66F 7/04 187/253 |
| 5,727,656 A * | 3/1998 | Gaudioso | ............. | B66F 7/02 254/89 R |
| 5,915,500 A * | 6/1999 | Weaver | ............. | B66F 7/04 187/221 |
| 6,814,342 B1 * | 11/2004 | Perlstein | ............. | B66F 7/02 254/133 R |
| 9,688,252 B2 * | 6/2017 | Gaffoglio | ............. | B60L 53/80 |
| 9,902,599 B1 * | 2/2018 | Veresko | ............. | B66F 7/10 |
| 11,820,632 B2 | 11/2023 | Kritzer et al. | | |
| 2017/0259675 A1 | 9/2017 | Gaffoglio et al. | | |
| 2019/0135597 A1 * | 5/2019 | Ferrone | ............. | B66F 7/28 |
| 2022/0017342 A1 | 1/2022 | Kritzer | | |
| 2022/0402735 A1 | 12/2022 | Kritzer | | |
| 2023/0294965 A1 | 9/2023 | Kritzer | | |
| 2024/0017974 A1 * | 1/2024 | Stewart | ............. | B66C 1/12 |
| 2024/0246796 A1 | 7/2024 | Kritzer | | |
| 2024/0327177 A1 * | 10/2024 | Averill | ............. | B66F 7/28 |
| 2024/0359957 A1 * | 10/2024 | Taylor | ............. | B66F 7/28 |

FOREIGN PATENT DOCUMENTS

| DE | 102016114599 A1 * | 2/2018 |
|---|---|---|
| WO | 2020202226 A1 | 10/2020 |

* cited by examiner

*Primary Examiner* — Anna M Momper
*Assistant Examiner* — Michelle M Mudwilder
(74) *Attorney, Agent, or Firm* — AVEK IP, LLC; Kent R. Erickson

(57) ABSTRACT

A combination two post vehicle and battery lift includes a pair of upstanding post assemblies, each having a vehicle lift assembly and battery lift assembly. Each lift assembly includes a lift carriage having lift arms articulated thereto. The lift assemblies are operated in coordination to lift and lower an electric vehicle and a battery in relation to the vehicle.

20 Claims, 6 Drawing Sheets

COMBINATION TWO POST VEHICLE AND BATTERY LIFT

CROSS-REFERENCE TO RELATED APPLICATIONS

This application claims the benefit of U.S. Provisional Patent Application No. 63/499,291, filed May 1, 2023, the disclosure of which is hereby incorporated herein in its entirety by reference.

BACKGROUND OF THE INVENTION

Field of the Invention

This invention relates to automobile service lifts and, more particularly, to a combination two-post lift for both an electric vehicle and a battery for propelling the vehicle.

Background & Description of Related Art

A wide variety of post-type automobile lifts have been previously known and used in automobile maintenance and repair to provide access to components on the lower or undersides of vehicles such as tires, brakes, exhaust components, and the like for inspection, repair, and replacement purposes. Post lifts can be in-ground varieties with some components below the floor surface of the shop or above-ground varieties which are mounted on the floor. In-ground post lifts usually have one or two vertically ascending columns mounted below the floor of a service facility, such as a garage, shop, or the like that are raised hydraulically or pneumatically to lift the vehicle. Above-ground post lifts generally have two or four vertical columns or posts, each of which includes a carriage that rides up and down the post. Each of the carriages of a two post lift includes a pair of inwardly extending lift arms with vehicle engagement structure, such as lift pads, at ends thereof that engage lift points or locations on the underside of a body or frame of a vehicle to be lifted. The lift arms are adjusted in length and angular position to engage front and back and left and right lift points of the vehicle.

The vehicle lift arms are typically formed of telescoping sections which are pivotally connected to the lift carriage that is slidably mounted on the post and selectively movable vertically on the post by an actuator, such as a pressurized fluid cylinder connected between the lift carriage and the post. The telescoping lift arm sections enable adjustment of the lengths of the lift arms, and the pivotal connection of the arms to the lift carriage enables adjustment of the angles thereof to allow the lift system to accommodate a variety of vehicle sizes and proportions. The lengths of the lift arms and their angular positions relative to the lift carriage are usually adjusted manually by a mechanic to position the lift pads for engagement with particular lift points of the vehicle. Representative types of such two-post vehicle lift systems are disclosed in U.S. Pat. No. 9,150,395, and U.S. Publication Nos. 2021/0331904 and 2022/0017342, the disclosures of which are incorporated herein in their entirety by reference.

Electrically propelled vehicles, such as automobiles, employ very large rechargeable battery packs to operate propulsion motors. Such vehicles are referred to as electric vehicles (EV's) when propelled solely by a battery or as hybrids if an internal combustion engine is incorporated into the vehicle. Although the batteries for electric vehicles typically have long lives, replacement may eventually be required. Manufacturing defects in the batteries and other circumstances may require earlier replacement. The batteries for electric vehicles may range in weight from about 200 to 500 kilograms (400 to 1200 pounds) or more for passenger vehicles and are usually accessible from beneath the vehicle for replacement. Batteries for full sized electrically propelled pickup trucks, delivery vehicles, and the like are even larger and heavier.

The battery pack or battery of an electric vehicle is typically a large, relatively flat assembly which is secured within a large shallow recess or well on the underside of the vehicle by removable fasteners. The battery is electrically connected to the vehicle electrical motor and systems by separable connectors. For removal, the battery is supported from below while fasteners are removed. The battery is then lowered which enables components of the electrical connectors to separate. The process for installing a new battery reverses the removal process. However, installation of the battery requires precise alignment of components of the mechanical fasteners and electrical connectors prior lifting the battery into the battery recess.

Apparatus and mechanisms have been developed for use with existing two-post lift systems for lifting and lowering an EV battery pack in relation to a vehicle supported by the lift system. Such an EV battery lift is described in U. S. Publication No. US 2022/0402735, the disclosure of which is incorporated herein in its entirety by reference. Such a battery lift may include hydraulic lift actuators, along with a motor, pump, and reservoir for the actuators.

SUMMARY OF THE INVENTION

The present invention provides embodiments of a two-post lift apparatus which incorporates lift members both for an electric vehicle and the battery for propelling the vehicle which operate in coordination on the two lift posts.

An embodiment of a two-post lift apparatus for lifting and lowering a vehicle and a vehicle component, such as a battery for propelling the vehicle and comprising: first and second lift post assemblies upstanding from a support surface and positioned in laterally spaced relation, each lift post assembly having a primary or vehicle lift track and a secondary or battery lift track extending therealong in spaced apart, parallel relation; each vehicle lift track having a respective primary or vehicle lift carriage positioned therein to enable travel therealong, and each battery lift track having a respective secondary or battery lift carriage positioned therein to enable travel therealong; a vehicle lift actuator assembly engaged between the vehicle lift carriages and the lift post assemblies and operable to enable movement of the vehicle lift carriages along the associated vehicle lift track; a battery lift actuator assembly engaged between the battery lift carriages and the lift post assemblies and operable to enable movement of the battery lift carriages along the associated battery lift track; each vehicle lift carriage having a respective pair of vehicle lift arms or primary lift arms connected thereto to in such a manner as to enable selective engagement thereof with an underside of a vehicle; each battery carriage having a respective pair of battery lift arms or secondary lift arms connected thereto in such a manner as to enable selective engagement thereof with an underside of a battery of a vehicle; and the vehicle lift actuator assembly and the battery lift actuator assembly being controlled in such a manner as to enable selective lifting and lowering of a vehicle and a battery of the vehicle.

In an embodiment of the two post lift apparatus, the vehicle lift actuator assembly may include a respective vehicle lift actuator positioned within each lift post assembly and engaged between the lift post assembly and vehicle lift carriage engaged therewith. The lift apparatus may include an elongated trough member extending between upper ends of the lift post assemblies, and the battery lift actuator assembly may include a battery lift actuator supported by the trough member and engaged with the trough member and each of the battery lift carriages.

In an embodiment of the combination lift apparatus, the primary or vehicle lift tracks are positioned on inward sides of their respective post assemblies in mutually inwardly facing relation, and the secondary or battery lift tracks are positioned on outward sides of their respective post assemblies in mutually outwardly facing relation. Each of the lift arms is pivotally connected to its respective lift carriage; and each of the lift arms is extendible and retractable and has a contact member positioned at an outer end thereof to enable flexible selective positioning of the contact member relative to a load, such as the vehicle or vehicle component, to be lifted thereby. In an embodiment of the combination lift system, the contact member for the battery lift arms may include: an elongated stiffener member extending between outer ends of the battery lift arms; and a pair of battery contact pads positioned on the stiffener member in longitudinally spaced relation thereon.

In an embodiment of the combination lift system, the contact member for the battery lift arms may include a respective battery lift extension upstanding from an end of each battery lift arm; an elongated stiffener member engaged with each battery lift extension; and a pair of battery contact pads positioned on the stiffener member in longitudinally spaced relation thereon. Each battery lift extension may include a swivel member connecting it to its associated battery lift arm to enable rotation of the battery lift extension about a respective vertical axis. The stiffener member may engage each battery lift extension in such a manner as to enable the stiffener member to slide in a longitudinal direction thereof relative to the stiffener member lift extension; and each battery contact pad may be slidable engaged with the associated battery lift extension.

In an embodiment of the combination lift system, an elongated trough member extends between upper ends of the post assemblies, and a battery lift actuator is positioned within the trough member and is engaged with each battery lift carriage in such a manner as to enable coordinated lifting and lowering of the battery lift arms. The battery lift arms may be configured to enable folding thereof to such positions as to enable the vehicle lift arms to be lowered sufficiently for engagement with the underside of a vehicle positioned on the support surface.

In an embodiment of the combination lift system, a contact adapter to engage a load to be lifted may include: a contact receiver positioned at an end of a lift arm of the system; a contact adapter member configured to be removably engaged with the contact receiver; and the contact adapter member having an upper shape which is compatible with a shape of a contact element of the load to be lifted in order to provide substantially non-slip engagement of the contact adapter member with the contact element. A contact spacer may be engaged between the contact adapter member and the contact receiver to position the contact adapter member at a selected height above the lift arm of the lift system.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

Figure 1:
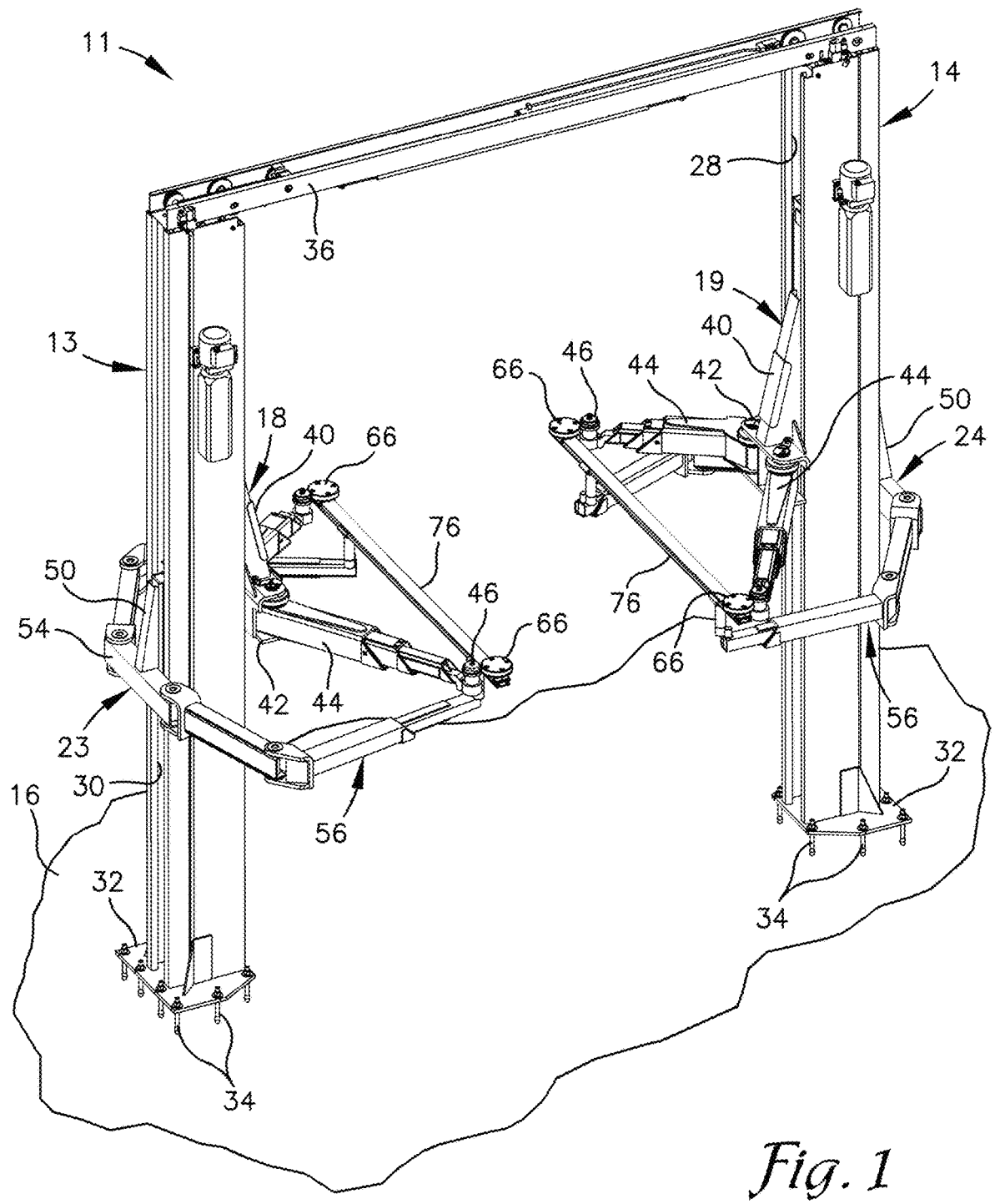
FIG. 1 is a perspective view of a two-post vehicle and battery lift system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference number 11 generally designates an embodiment of a combination two-post lift apparatus according to the present invention. In general, the two-post lift apparatus 11 includes an elongated right post assembly 13 and an elongated left post assembly 14 upstanding in laterally spaced relation from a support surface 16. The left and right post assemblies may also be referred to as first and second lift post assemblies. A right vehicle lift assembly 18 is slidably engaged with the right post assembly 13, and a left vehicle lift assembly 19 is slidably engaged with the left post assembly 14. The vehicle lift assemblies 18 and 19 are operated in coordination to lift and lower a vehicle, such as an electric vehicle or EV 21 (FIG. 2), with respect to the surface 16.

Additionally, a right battery lift assembly 23 is slidably engaged with the right post assembly 13, and a left battery lift assembly 24 is slidably engaged with the left post assembly 14. The battery lift assemblies 23 and 24 are operated in mutual coordination, and in coordination with the vehicle lift assemblies 18 and 19, to lift and lower a battery pack or battery 26 (FIG. 2) with respect to the vehicle 21. The vehicle lift assemblies may also be referred to as primary lift assemblies and the battery lift assemblies may also be referred to as secondary lift assemblies or vehicle component lift assemblies. In one embodiment, the battery 26 is a battery adapted to provide sufficient power to propel the vehicle.

Figure 2:
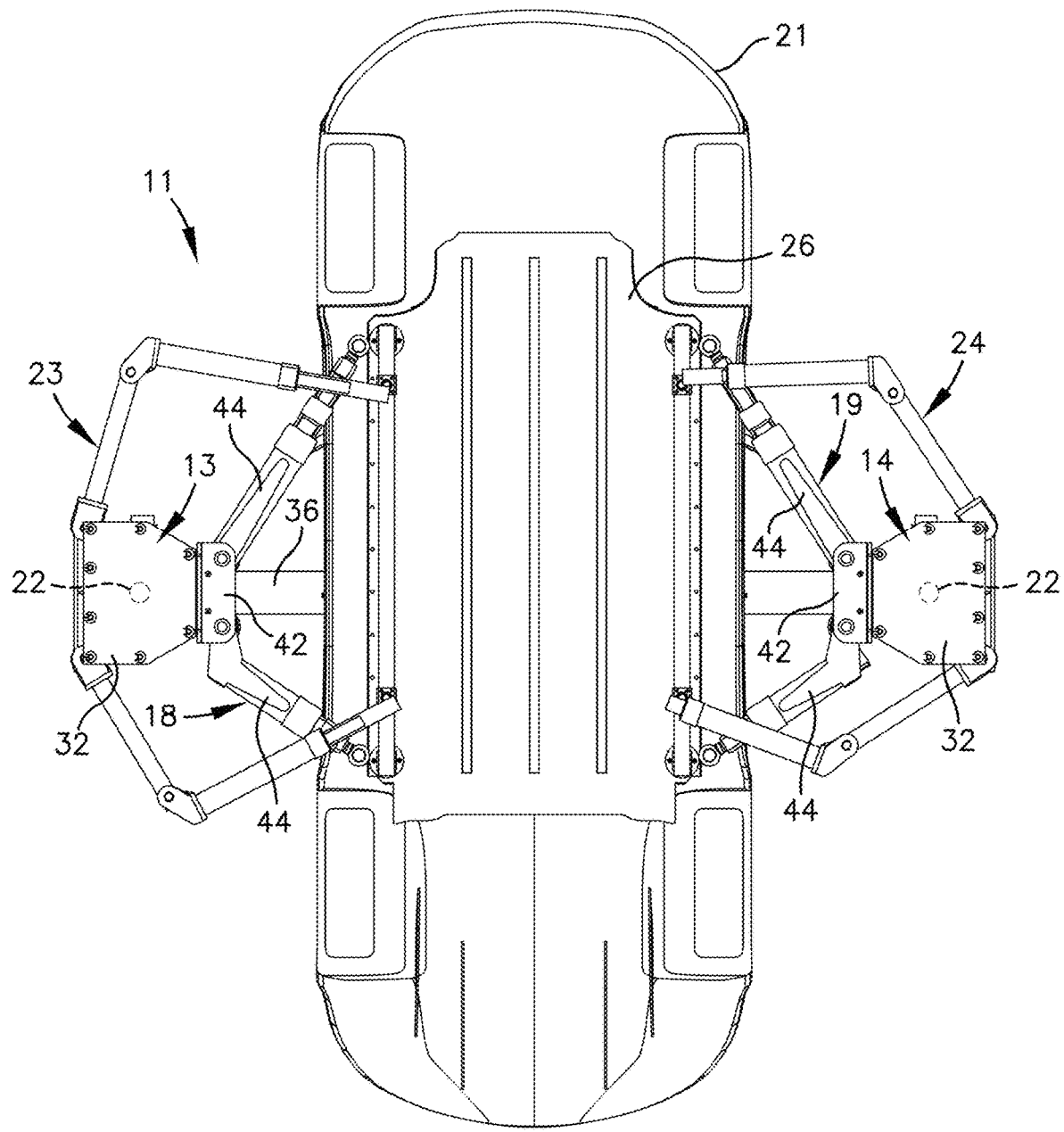
FIG. 2 is an enlarged bottom plan view of the lift system supporting an electric vehicle and a battery for propelling the vehicle.
Figure 3:
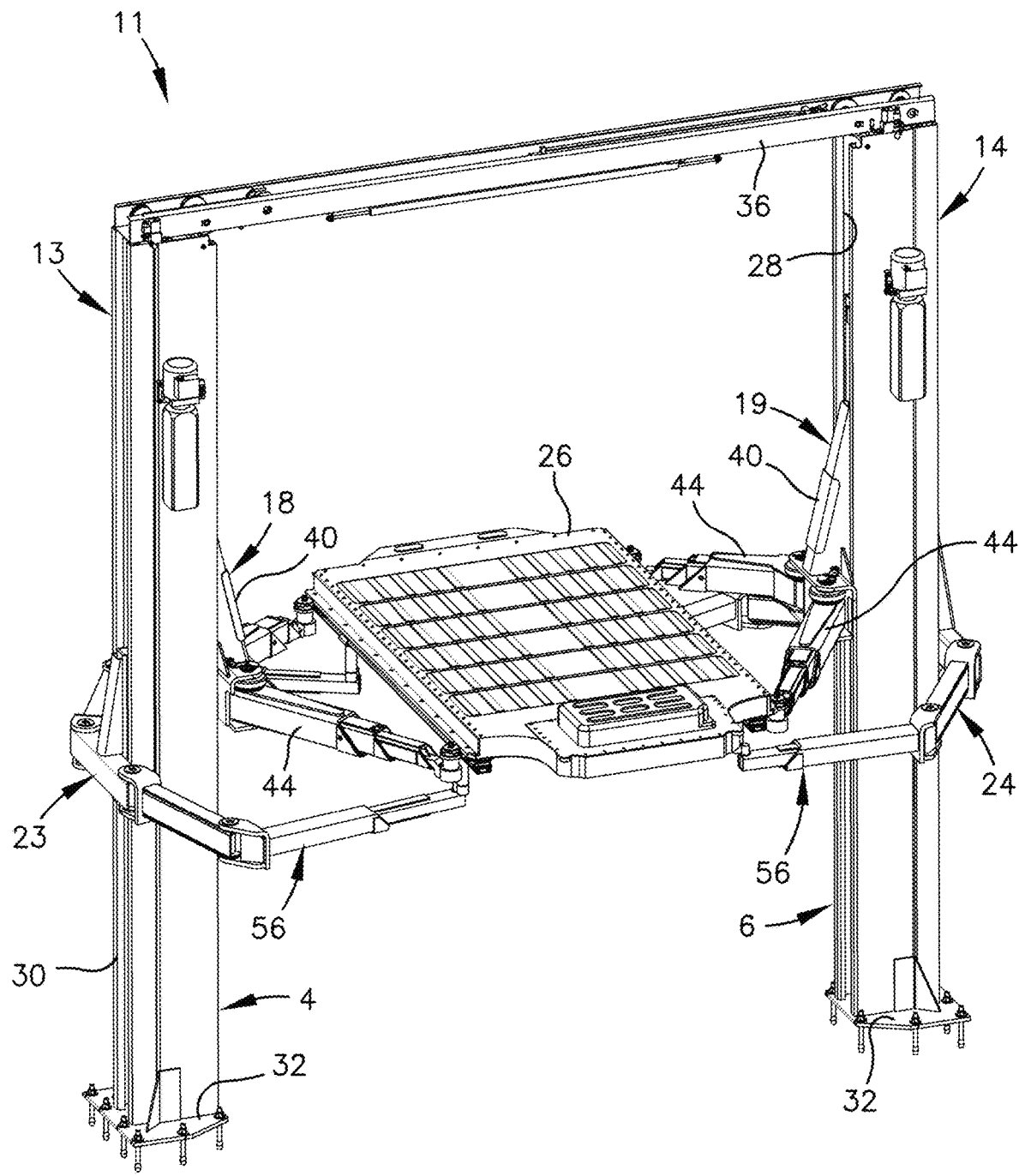
FIG. 3 is a perspective view of the lift system shown supporting a battery of an electric vehicle.

It should be noted that the directional references employed in FIGS. 1-3 are made with respect to the vehicle 21 such that the right and left sides of the apparatus 11 and the vehicle 21 are opposite to the right and left sides of FIGS. 1-3, as viewed.

Each of the illustrated post assemblies 13 and 14 includes a primary lift track or vehicle lift guide 28 extending along an inward side thereof and a secondary lift track or battery lift guide 30 extending along an outward side thereof in parallel relation to the primary lift track 28. Each of the post assemblies 13 and 14 may be formed by a pair of elongated members having a squared C-shape cross section with closed sides joined in back to back relation. Open sides of the post assemblies 13 and 14 form the guides or tracks 28 and 30 with the vehicle lift tracks 28 extending in mutually inward facing relation and the battery lift tracks 30 extending in mutually outward facing relation. Each of the post assemblies 13 and 14 has a base plate 32 through which fasteners, such as bolts 34 pass. The bolts 34 may be embedded in the floor forming the support surface 16, such as a vehicle repair facility floor. Upper ends of the post assemblies 13 and 14 are structurally joined by a trough member 36 through which control conductors, lift cables, and the like may extend.

Each of the illustrated vehicle lift assemblies 18 and 19 includes a primary or vehicle lift carriage 40 which is slidably supported within a respective vehicle lift guide 28 to enable vertical movement therealong. At a lower end of each vehicle lift carriage 40, a vehicle lift clevis 42 is provided which has inner ends of a pair of primary or vehicle lift arm assemblies or arms 44 pivotally connected thereto. Each vehicle lift arm assembly 44 has extendible and retractable, telescoping sections which enable the length of the arm assembly to be selectively adjusted. The illustrated vehicle lift carriage 40 may incorporate a releasable means (not shown) of preventing free pivoting of the arm assemblies relative to the clevis 42 for safety purposes.

A vehicle contact member 46 is supported at the outer end of each vehicle lift arm 44 for engagement with a lift point of the vehicle 21 to thereby support the load of the vehicle as the vehicle is lifted and lower relative to the support surface. Pivoting and extension or retraction of the vehicle lift arms 44 allows the lift arms 44 to be selectively positionable relative to the vehicle to position the contact members 46 in position to support a portion of the load of the vehicle.

The lift assemblies 18 and 19 may be raised and lowered simultaneously by means of respective primary actuator assemblies or linear actuators, such as hydraulic cylinders 22 (see FIG. 2), connected between post assemblies 13 and 4 respectively and the vehicle lift assemblies 18 and 19. Further details of the vehicle lift assemblies 18 and 19 may be found in U. S. Publication 2021/0331904, previously referenced, the disclosure of which is incorporated herein by reference.

Figure 8:
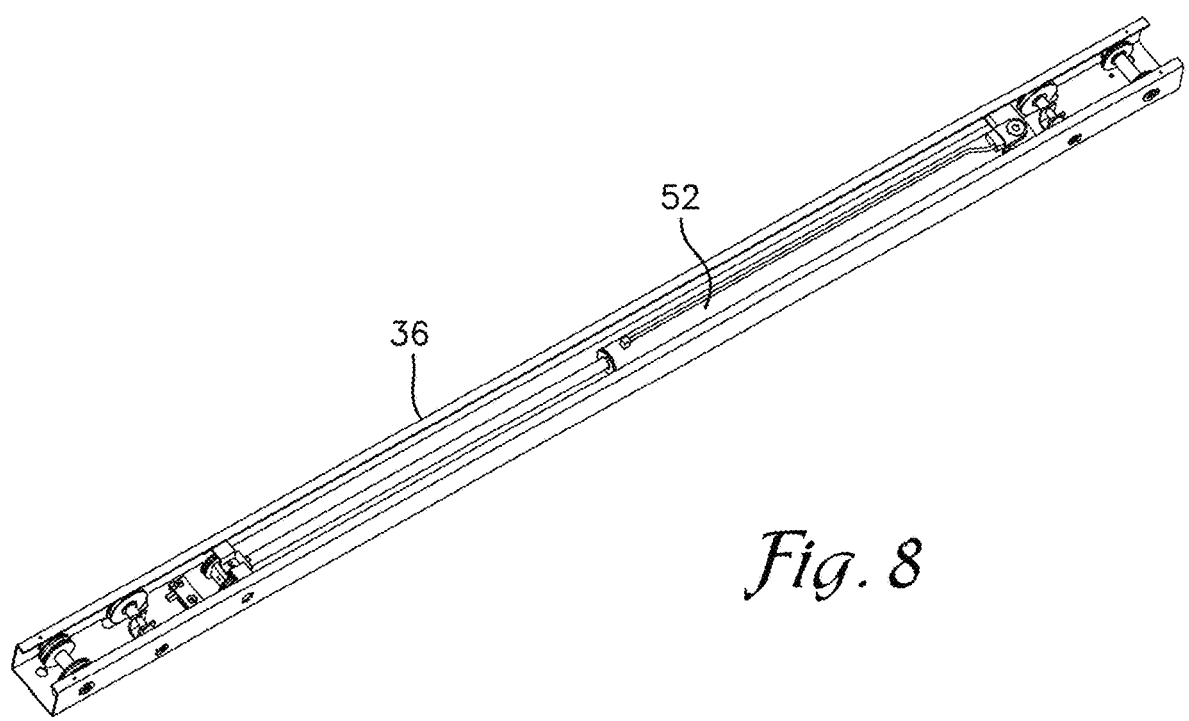
FIG. 8 is a fragmentary perspective view of a cross-over trough member of the lift system, including an actuator for the battery lift assemblies.

Referring to FIGS. 1-4, the illustrated battery lift assemblies 23 and 24 are substantially similar, and each includes a secondary or battery lift carriage 50 which is slidably positioned within the battery lift guide 30 of the associated post assembly 13 or 14. The battery lift carriages 50 are raised and lowered by a secondary or battery lift actuator 52 (FIG. 8) which, in the illustrated embodiment, is positioned within the trough 36 and engaged with the carriages by means of battery lift cables (not shown) routed therebetween to enable simultaneous lifting and lowering of the carriages 50. The battery lift actuator 52 and battery lift cables comprise an embodiment of a secondary or battery lift actuator assembly. It is foreseen that separate hydraulic actuators may be connected between each battery lift carriage 50 and the respective lift post assemblies 13 and 14 may comprise an alternative battery lift actuator assembly. It is foreseen that some type of ratchet arrangement (not shown) may be engaged between the battery lift carriages 50 and the post assemblies 13 and 14 to limit the descent of the battery 26 in the event of loss of hydraulic pressure by the battery lift actuator 52.

Figure 4:
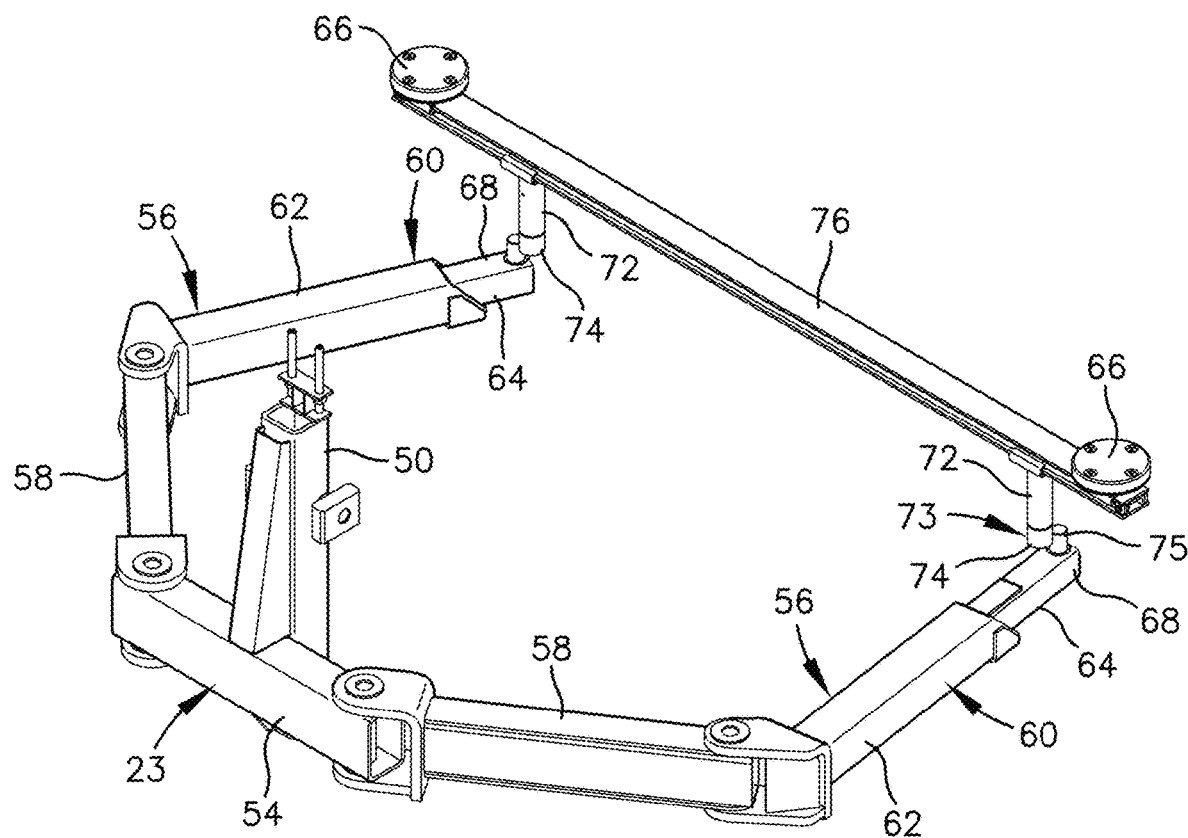
FIG. 4 is a further enlarged perspective view a battery lift assembly of the lift apparatus.

Referring particularly to FIG. 4, each lift carriage 50 includes a lower cross member 54 extending horizontally thereacross. At each end of the cross member 54, a battery lift arm assembly 56 is connected thereto to enable pivoting about a substantially vertical axis. Each of the illustrated battery lift arm assemblies 56 includes an upper arm member 58, which is pivotally connected to the cross member 54, and a telescoping forearm member 60 which is pivotally connected to the upper arm member 58. The terms "upper arm" and "forearm" describing the arm members 58 and 60 are analogous to human anatomical terms. The forearm 60 is formed by an outer arm section 62 which is connected to the cross member 54 and an inner arm section 64 which telescopes into the outer arm section 62.

The inner arm sections 64 may have battery contact pads 66 which may be supported directly on outer ends thereof. In the illustrated battery lift assemblies 23 and 24, the outer ends 68 have battery lift pad extensions 72 upstanding therefrom. The battery lift pad extensions 72 are connected to the outer ends 68 of the arm sections 64 by swivel members 73 which are pivotally connected to the lift pad extensions 72 and to the outer ends 68 of the arm sections 64. The swivel members 73 shown include a cylindrical receiver 74 with a pin or shaft 75 connected to and depending from one side of the receiver 74. A lower end of the lift pad extension 72 is received within the receiver 74, and the pin 75 of the swivel member 73 is received within an opening or receiver (not shown) formed in the distal end of the inner arm section 64 of each battery lift arm assembly 56.

Figure 5:
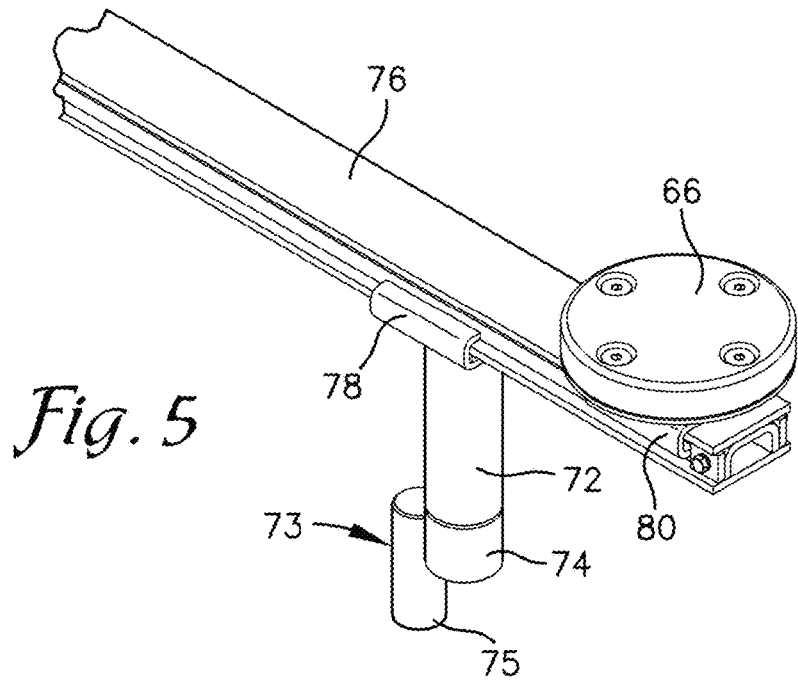
FIG. 5 is a further enlarged fragmentary perspective view of one end of a stiffener link and battery contact pad of the battery lift assembly.

An elongated stiffener member or beam 76 extends between upper ends of the lift pad extensions 72 of each of the battery lift assemblies 23 and 24. In the illustrated battery lift assemblies, the stiffener beam 76 slidably engages extension slide brackets or slides 78 (FIG. 5) positioned at the upper end of each of the lift pad extensions 72. The battery contact pads 66 are supported on the stiffener beam 76 in longitudinally spaced relation thereon by means of battery contact pad side brackets or slides 80. The pivotability of the battery lift arm assemblies 56, the telescoping nature of the forearm members 60, the swivels 74, and the slide brackets 78 and 80 provide a considerable degree of adjustability of the position of the battery contact pads 66 for accurate placement thereof in relation to the battery 26. The stiffener beams 76 provide a degree of rigidity to the battery lift assemblies 23 and 24, when supporting the battery 26, to reduce tendencies to flex the battery.

Figure 6:
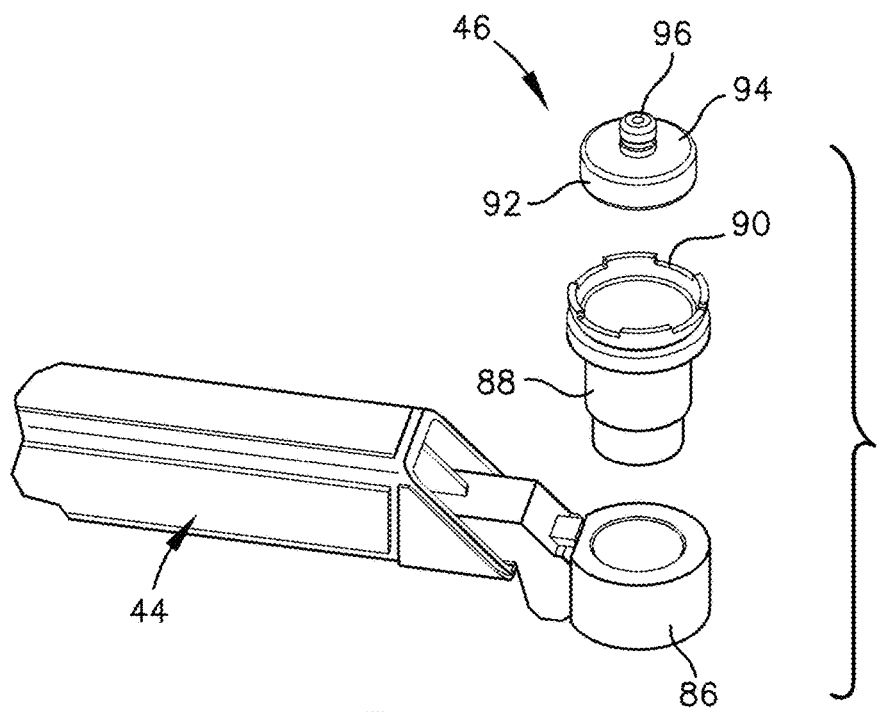
FIG. 6 is a fragmentary exploded perspective view of a vehicle lift arm along with a contact pad and an adapter for the contact pad.

Referring to FIG. 6, the illustrated vehicle contact member or contact adapter 46 may be supported a contact receiver 86 positioned at an end of one of the vehicle lift arm assemblies 44 by a vertical spacer 88 positioned in the receiver 86 and having a dish adapter 90 secured to the top of the spacer 88. A contact pad member 92 is removably positioned on the dish adapter 90 and includes a padding material 94 thereon, such as a hard rubber. The pad member 92 may have an upper shape which may comprise an upstanding center protrusion 96 which is compatible in shape with or mates with a shape of a contact element or lift point fixture (not shown) provided on the underside of the vehicle 21 to provide non-slip engagement therebetween for safe lifting and lowering of the vehicle.

Figure 7:
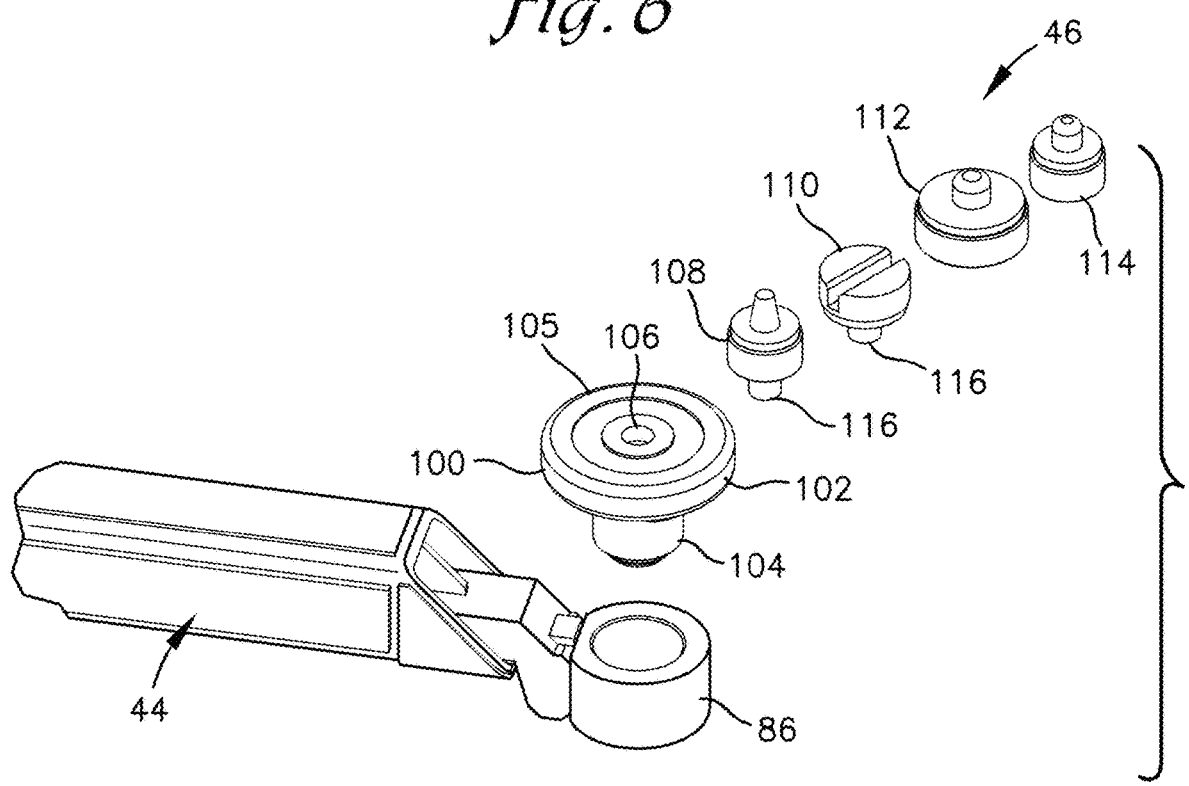
FIG. 7 is a view similar to FIG. 6 and illustrates several alternative embodiments of contact pad adapters for a vehicle lift arm of the lift system.

FIG. 7 illustrates modified embodiments of a vehicle contact member 46 including a vehicle contact member 100. The contact member 100 includes an upper contact pad 102 having a mounting shaft 104 depending therefrom. The shaft 104 is sized to be positioned in the contact receiver 86 and may have such a length as to position the body of the vehicle 21 at a specific height above the lift arm assembly 44. The contact pad 102 may be covered by a padding material 105, such as a hard rubber. The contact pad 102 may be provided with a centered aperture 106 to receive an additional adapter, such as a selected one of the contact adapters 108, 110, 112, or 114 having varied geometries to mate with different features on the underside of the vehicle 21. It is foreseen that adapters having additional alternative configurations can be provided for use with the contact receiver 86 and pad member 100. Each adapter 108, 110, 112, or 114 preferably includes a depending stem 116 for reception within the centered aperture 106 of the contact pad 102. The stem 116 is sized relative to the centered aperture 106 to permit rotation of the associated adapter 108, 110, 112, or 114 relative to the contact pad 102 to permit proper alignment of the adapter 108, 110, 112, or 114 with the mating feature on the vehicle 21.

It is to be understood that while certain forms of the present invention have been illustrated and described herein, it is not to be limited to the specific forms or arrangement of parts described and shown.

What is claimed and desired to be secured by Letters Patent is:

1. A two-post lift apparatus for lifting and lowering a vehicle and a vehicle component, the two-post lift apparatus comprising:
   first and second lift post assemblies upstanding from a support surface and positioned in laterally spaced relation, each of the first and second lift post assemblies having a primary lift track and a secondary lift track extending therealong in spaced apart, parallel relation;
   each primary lift track having a respective primary lift carriage positioned therein to enable travel therealong, and each secondary lift track having a respective secondary lift carriage positioned therein to enable travel therealong;
   a primary lift actuator assembly engaged between the primary lift carriages and the first and second lift post assemblies and operable to enable movement of the primary lift carriages along the primary lift track associated therewith;
   a respective secondary lift actuator assembly engaged between the secondary lift carriages and the first and second lift post assemblies and operable to enable movement of the secondary lift carriages along the associated secondary lift track;
   each primary lift carriage having a respective pair of primary lift arms connected thereto and selectively positionable to support a portion of a load of the vehicle thereon;
   each secondary lift carriage having a respective pair of secondary lift arms connected thereto and selectively positionable to support a portion of a load of the vehicle component thereon; and
   the primary lift actuator assemblies and the secondary lift actuator assemblies operable to selectively lift and lower the vehicle and the vehicle component;
   the primary lift tracks are positioned on inward sides of the respective first and
   second post assemblies in mutually inwardly facing relation; and
   the secondary lift tracks are positioned on outward sides of their respective first
   and second post assemblies in mutually outwardly facing relation.

2. The two-post lift apparatus as in claim 1 wherein:
   each of the primary and secondary lift arms is pivotally connected to its respective primary or secondary lift carriage; and
   each of the primary and secondary lift arms is extendible and retractable and has a contact member positioned at an outer end thereof to enable selective positioning of the contact member relative to the load to be lifted thereby.

3. The two-post lift apparatus as in claim 2 wherein the contact member for the secondary lift arms includes:
   an elongated stiffener member extending between outer ends of the secondary lift arms; and
   a pair of vehicle component contact pads positioned on the stiffener member in longitudinally spaced relation thereon.

4. The two-post lift apparatus as in claim 2 wherein the contact member for the secondary lift arms includes:
   a respective vehicle component lift extension upstanding from an end of each secondary lift arm;
   an elongated stiffener member engaged with each vehicle component lift extension; and
   a pair of vehicle component contact pads positioned on the stiffener member in longitudinally spaced relation thereon.

5. The two-post lift apparatus as in claim 4 wherein:
   each vehicle component lift extension includes a swivel member connecting it to its associated secondary lift arm to enable rotation of the vehicle component lift extension about a respective vertical axis.

6. The two-post lift apparatus as in claim 4 wherein:
   the stiffener member engages each vehicle component lift extension to enable the stiffener member to slide in a longitudinal direction thereof relative to the vehicle component lift extension; and
   each vehicle component contact pad is slidably engaged with the vehicle component lift extension associated therewith.

7. The two-post lift apparatus as in claim 1 wherein:
   an elongated trough member extends between upper ends of the first and second post assemblies; and
   a secondary lift actuator is positioned within the trough member and is engaged with each secondary lift carriage to enable coordinated lifting and lowering of the secondary lift arms.

8. The two-post lift apparatus as in claim 1 wherein:
   the secondary lift arms are configured to enable pivoting thereof to such positions as to enable the primary lift arms to be lowered for engagement with an underside of the vehicle positioned on the support surface.

9. The two-post lift apparatus as in claim 1 wherein the primary lift actuator assembly includes:
   a respective primary lift actuator positioned within each primary and secondary lift post assembly and engaged between the respective first and second lift post assembly and primary lift carriage engaged therewith.

10. The two-post lift apparatus as in claim 1 and including:
an elongated trough member extending between upper ends of the first and second lift post assemblies; and
the secondary lift actuator assembly includes a secondary lift actuator supported by the trough member and engaged with the trough member and each of the secondary lift carriages.

11. A contact adapter for use on an arm of the two-post lift apparatus according to claim 1 to engage a load to be lifted and comprising:
a contact receiver positioned at an end of a lift arm of the two-post lift assembly;
a contact adapter member configured to be removably engaged with the contact receiver; and
the contact adapter member having an upper shape which is compatible with a shape of a contact element of the load to be lifted to provide a substantially non-slip engagement of the contact adapter member with the contact element.

12. The contact adapter as in claim 11 and including:
a contact spacer engaged between the contact adapter member and the contact receiver to position the contact adapter member at a selected height above the lift arm of the two-post lift assembly.

13. A two-post lift apparatus for lifting and lowering relative to a support surface a vehicle and a battery for propelling the vehicle, the two-post lift apparatus comprising:
first and second lift post assemblies, each of the first and second lift post assemblies having an inner vehicle lift guide track and an outer battery guide track, the inner vehicle lift guide tracks being oriented in mutually facing relation and the outer battery lift guide tracks facing outwardly in opposite directions;
each inner vehicle lift guide track having a respective vehicle lift carriage positioned therein to enable travel therealong, and each outer battery lift guide track having a respective battery lift carriage positioned therein to enable travel therealong;
a vehicle lift actuator assembly engaged between the vehicle lift carriages and the first and second lift post assemblies and operable to enable movement of the vehicle lift carriages along the inner vehicle lift guide track associated therewith;
a battery lift actuator assembly engaged between the battery lift carriages and the first and second lift post assemblies and operable to enable movement of the battery lift carriages along the associated outer battery lift guide track;
each vehicle lift carriage having first and second vehicle lift arms pivotally connected thereto to enable selective engagement thereof with an underside of the vehicle;
each battery lift carriage having first and second battery lift arms pivotally connected thereto to enable selective engagement thereof with an underside of the battery;
each of the vehicle lift arms is extendible and retractable and has a respective vehicle contact member positioned at an outer end thereof to enable selective positioning of the vehicle contact member relative to the vehicle to be lifted and each of the battery lift arms is extendible and retractable and has a respective battery contact member positioned at an outer end thereof to enable selective positioning of the battery contact member relative to the battery to be lifted; and
the vehicle lift actuator assembly and the battery lift actuator assembly operable to enable coordinated lifting and lowering of the vehicle and the battery.

14. The two-post lift apparatus as in claim 13 wherein the battery contact member comprises:
an elongated stiffener member extending between outer ends of the battery lift arms associated with the associated battery lift carriage; and
a pair of battery contact pads positioned on the stiffener member in longitudinally spaced relation thereon.

15. The two-post lift apparatus as in claim 13 wherein the battery contact member comprises:
a battery lift extension upstanding from an end of each battery lift arm;
an elongated stiffener member engaged with the battery lift extensions associated with the associated battery lift carriage; and
a pair of battery contact pads positioned on the elongated stiffener member in longitudinally spaced relation thereon.

16. The two-post lift apparatus as in claim 15 wherein:
each battery lift extension includes a swivel member connecting the battery lift extension to the associated battery lift arm to enable rotation of the battery lift extension about a respective vertical axis.

17. The two-post lift apparatus as in claim 15 wherein:
the elongated stiffener member engages the battery lift extensions to enable the elongated stiffener member to slide in a longitudinal direction thereof relative to the battery lift extensions engaged therewith; and
each battery contact pad is slidable engaged with the battery lift extension associated therewith.

18. The two-post lift apparatus as in claim 13 wherein the vehicle lift actuator assembly includes:
a respective vehicle lift actuator positioned within each lift post assembly and engaged between the lift post assembly and vehicle lift carriage engaged therewith.

19. The two-post lift apparatus as in claim 13 wherein:
an elongated trough member extends between upper ends of the post assemblies; and
a battery lift actuator assembly is supported by the trough member and is engaged with each battery lift carriage to enable coordinated lifting and lowering of the battery lift arms.

20. The two-post lift apparatus as in claim 13 wherein:
the battery lift arms are configured to enable pivoting thereof to such positions as to enable the vehicle lift arms to be lowered sufficiently for engagement with the underside of the vehicle positioned on the support surface.

* * * * *